(12) United States Patent
LaPlante et al.

(10) Patent No.: US 7,933,688 B2
(45) Date of Patent: *Apr. 26, 2011

(54) ELECTRICALLY CONTROLLED PRESSURE RELIEF VALVE AND SYSTEM AND METHOD FOR CONTROLLING SAME

(75) Inventors: John LaPlante, Bow, NH (US); William T. Larkins, Manchester, NH (US)

(73) Assignee: Fourth Floor Associates, Inc., Manchester, NH (US)

( * ) Notice: Subject to any disclaimer, the term of this patent is extended or adjusted under 35 U.S.C. 154(b) by 89 days.
This patent is subject to a terminal disclaimer.

(21) Appl. No.: 11/942,838

(22) Filed: Nov. 20, 2007

(65) Prior Publication Data
US 2008/0119963 A1 May 22, 2008

Related U.S. Application Data

(63) Continuation of application No. 11/266,016, filed on Nov. 3, 2005, now Pat. No. 7,299,112.

(60) Provisional application No. 60/624,636, filed on Nov. 3, 2004.

(51) Int. Cl.
*G05D 9/00* (2006.01)
(52) U.S. Cl. ...... 700/281; 700/282; 137/14; 251/129.01
(58) Field of Classification Search .................. 700/281, 700/282; 137/14; 251/129.01
See application file for complete search history.

(56) References Cited

U.S. PATENT DOCUMENTS

| | | | | |
|---|---|---|---|---|
| 5,529,152 A | * | 6/1996 | Hamilton et al. | 188/266.6 |
| 6,128,541 A | * | 10/2000 | Junk | 700/39 |
| 6,276,458 B1 | * | 8/2001 | Malone et al. | 166/386 |
| 6,732,033 B2 | | 5/2004 | LaPlante et al. | |
| 6,948,461 B1 | | 9/2005 | Kotwicki | |
| 7,299,112 B2 | * | 11/2007 | LaPlante et al. | 700/282 |
| 2003/0160369 A1 | * | 8/2003 | LaPlante et al. | 267/136 |
| 2004/0039488 A1 | * | 2/2004 | Junk et al. | 700/282 |

OTHER PUBLICATIONS

Chinese Office Action with English language translation issued in corresponding Chinese Application No. 2005800446596, 6 pages.
Chinese Office Office Action dated Jan. 22, 2010 with English language translation issued in corresponding Chinese Application No. 200580044659.6, 7 pages.
Canadian Office Action dated Sep. 8, 2009 issued in corresponding Canadian Patent Application No. 2,586,137, 6 pages.
Chinese Office Action dated May 28, 2010 with English language translation issued in corresponding Chinese Application No. 200580044659.6, 7 pages.

* cited by examiner

*Primary Examiner* — Kidest Bahta
*Assistant Examiner* — Nathan Laughlin
(74) *Attorney, Agent, or Firm* — Grossman Tucker Perreault & Pfleger PLLC

(57) ABSTRACT

A system and method for controlling an electrically controlled pressure relief valve may use a soft position control loop to control the position of the valve. A pressure relief valve may also include a modified orifice shape to improve stability, to uniformly distribute the effective bandwidth over the valve operating range, and to provide a tunable default mode.

20 Claims, 7 Drawing Sheets

ELECTRICALLY CONTROLLED PRESSURE RELIEF VALVE AND SYSTEM AND METHOD FOR CONTROLLING SAME

CROSS-REFERENCE TO RELATED APPLICATIONS

This application is a continuation of application Ser. No. 11/266,016 filed Nov. 3, 2005, now U.S. Pat. No. 7,299,112, which claims the benefit of U.S. Provisional Patent Application Ser. No. 60/624,636, filed on Nov. 3, 2004, both of which are fully incorporated herein by reference.

FIELD

This disclosure relates to controllable valves and more particularly, to a system and method for controlling an electrically controlled pressure relief valve.

BACKGROUND

In general, a pressure relief valve may be designed to open at a specific pressure to prevent pressures in a system from exceeding certain limits. Pressure relief valves are widely used in a variety of applications. Pressure relief valves may be used for the purpose of providing safe operation in high pressure environments, for example, in hydraulic systems. Pressure relief valves may also be used to establish a known pressure for the purpose of providing control over a process, flow or motion. One example of an application for a pressure relief valve is a shock absorber application such as the semi-active shock absorber control system disclosed in U.S. Pat. No. 6,732,033, which is fully incorporated herein by reference.

Electrically controlled pressure relief valves may include an actuator that is electrically controlled, for example, in response to a command. Existing electrically controlled pressure relief valves may control the valve actuator electrically based upon a desired output pressure of the valve. While such electrically controlled pressure relief valves provide performance advantages, such as safety and known set pressure nearly independent of flow, there may also be disadvantages. Existing electrically controlled pressure relief valves may be unstable or may have a very long response time. The instability can be attributed to the interaction of the output pressure variation of the valve with other hydraulic system components such as the hydraulic compliance in the system or the inertia of the hydraulic fluid running in the hoses. To mitigate the instability, those of ordinary skill in the art may change the command to the valve slowly, reduce the system compliance or inertia, and/or slow down the step response of the valve to the command by adding a large amount of damping.

Another approach to providing control in a hydraulic system is to utilize a position-based valve that is controlled externally by electronics but is not hydraulically assisted with a pressure term. Such a valve may include precision machined components to shape the valve orifice geometry as a function of position. In practice, these valves can achieve a high level of control from a precision stand-point; however, the bandwidth is still very low because large amounts of damping may be required to avoid instability. These valves are also expensive, and since they are multi-stage, may require a high pressure source to function at any level of performance.

BRIEF DESCRIPTION OF THE DRAWINGS

Features and advantages of embodiments of the claimed subject matter will become apparent as the following Detailed Description proceeds, and upon reference to the Drawings, wherein like numerals depict like parts, and in which:

Although the following Detailed Description will proceed with reference being made to illustrative embodiments, many alternatives, modifications, and variations thereof will be apparent to those skilled in the art. Accordingly, it is intended that the subject matter be viewed broadly.

DETAILED DESCRIPTION

An electrically controlled pressure relief valve, consistent with embodiments of the present invention, is capable of delivering high speed performance to pressure relief and pressure control applications. In general, a valve control system and method may use a soft position control loop to control the position of the electrically controlled pressure relief valve. The electrically controlled pressure relief valve may also incorporate a tunable pressure term by shaping the valve orifice to improve stability and by shaping the valve orifice to uniformly distribute the effective bandwidth over the valve operating range. The electrically controlled pressure relief valve may also have a tunable default or failure mode, which allows the valve to continue operation with desired operating characteristics in the event of a loss of power.

Figure 1:
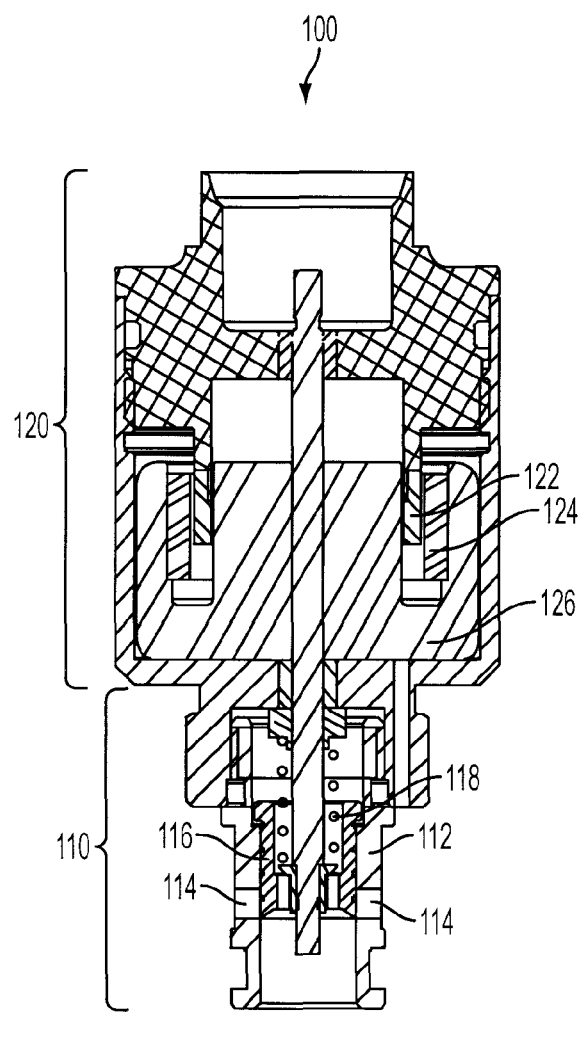
FIG. 1 is a cross-sectional view of an electrically controlled pressure relief valve in a closed position, consistent with one embodiment of the present invention.
Figure 2:
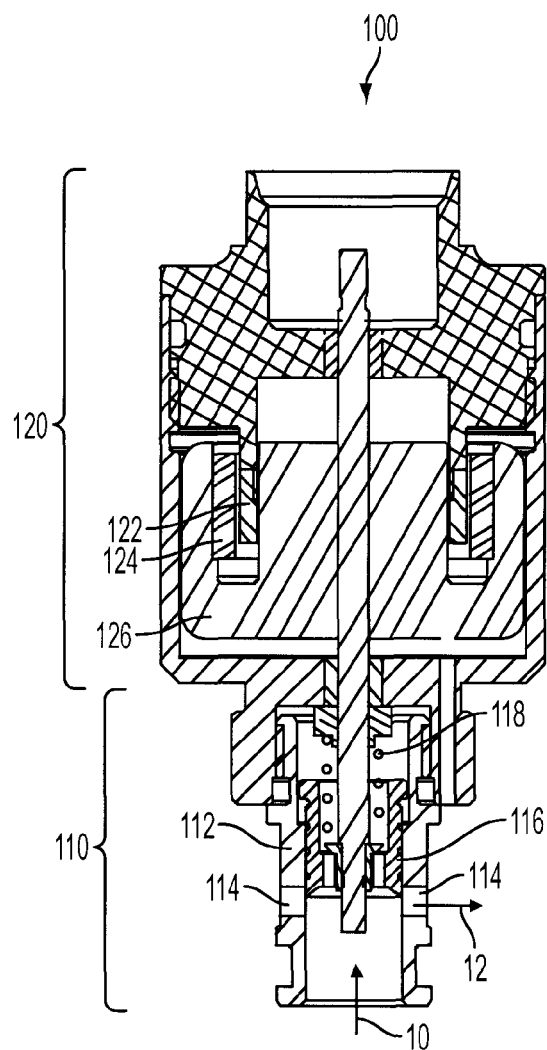
FIG. 2 is a cross-sectional view of an electrically controlled pressure relief valve in an open position, consistent with one embodiment of the present invention.

Referring to FIGS. 1 and 2, an electrically controlled pressure relief valve 100, according to an exemplary embodiment, may include a valve portion 110 and an actuator portion 120. The valve portion 110 may include a cylinder 112 with one or more variable orifices 114 and a piston 116 that moves within the cylinder 112 to control the opening of the orifice(s) 114. The valve 100 is in a closed position when the piston 116 is covering the orifice(s) 114 (FIG. 1). The valve 100 is in an open position when the piston 116 moves away from the orifice(s) 114 such that at least a portion of the orifice(s) 114 is opened (FIG. 2). In the open position, fluid may flow into the valve portion 110 (e.g., along the direction of arrow 10) and may flow out of the valve portion 110 (e.g., along the direction of arrow 12). The position of the piston 116 relative to the orifice(s) 114 varies the orifice opening and the flow through the valve portion 110. The valve 100 may thus provide an output pressure in response to an input flow.

The valve portion 110 may also include a spring 118 that applies a force against the piston 116 to bias the piston 116 toward the closed position. Fluid pressure against the piston 116 may result in a force that exceeds the spring force causing the piston 116 to move and open the orifice(s) 114. The fluid pressure that applies a force to the piston 116 may be referred to herein as the pressure term.

The actuator portion 120 may also apply a force to the piston 116. The actuator portion 120 may advantageously be back drivable to permit the pressure term to push open the valve, for example, during the onset of a high shock event. One embodiment of the actuator portion 120 is a voice coil type linear actuator including a voice coil 122, a magnet 124, and a back iron 126. The back iron 126 is coupled to the piston 116 such that linear movement of the back iron 126 causes linear movement of the piston 116.

The actuator portion 120 may be controlled using a command such as a voltage command, for example, provided by drive electronics (not shown) known to those skilled in the art. A voltage command to the actuator portion 120 causes current to flow through the coil 122, creating a magnetic field that applies a force to the magnet 124 and back iron 126. Different voltage commands may thus correspond to different amounts of force applied to the piston 116 in the valve 100.

Although one exemplary valve is shown, those skilled in the art will recognize that other types of pressure relief valves may be used. Although the exemplary actuator 120 is a voice coil type linear actuator, those skilled in the art will recognize that other types of actuator technologies may be used.

A valve control system may be used to control the electrically controlled pressure relief valve 100 using a soft position control loop. A soft position control loop may provide closed loop feedback control of the position of the electrically controlled pressure relief valve 100. The soft position control loop may control the position of the valve by determining a force to be applied by the actuator portion 120 that will move the valve portion 110 (e.g., the valve piston 116) to a desired position. The soft position control loop may also add a spring term and a damper term electrically to the electrically controlled pressure relief valve 100. The soft position control loop thus allows the position of the valve to go where it may in response to external inputs (e.g., current position, desired position, spring constant, and damping constant), rather than directly moving the valve to a precise position. Using the soft position control loop, the electrically controlled pressure relief valve 100 may thus produce repeatable linear pressure output across a variety of input flows for each commanded position of the valve.

Figure 3:
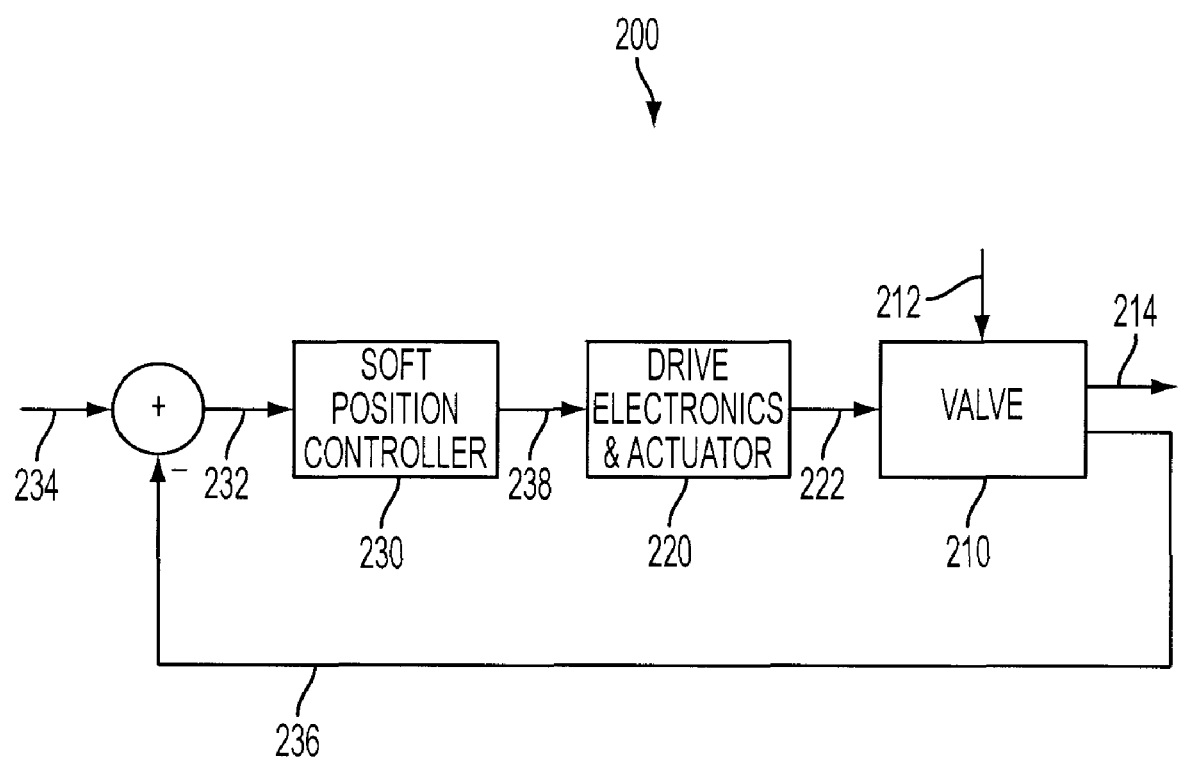
FIG. 3 is a schematic functional block diagram of a valve control system, consistent with one embodiment of the present invention.

Referring to FIG. 3, an exemplary valve control system 200 may include a pressure relief valve 210, drive electronics and actuator 220 for driving and actuating the valve 210, and a soft position controller 230 for controlling the position of the valve 210 using the drive electronics and actuator 220. The valve 210 may receive an input hydraulic fluid flow 212 and may provide an output hydraulic pressure 214 based on a position of the valve (e.g., a position of the valve piston relative to the valve orifice). The soft position controller 230 receives a positioning signal 232 based on a target valve position 234 and an actual valve position 236 and generates a valve control signal 238 indicative of a force to move the valve 210 from the actual position to the target valve position. The drive electronics and actuator 220 receive the valve control signal 238 and produce the force output 222 that should produce the target valve position of the valve 210.

The force output 222 may thus be applied to the valve 210 (e.g., to the valve piston) to move the valve 210 toward the target valve position. The force output 222 applied in response to the valve control signal 238 may simulate a spring force and/or a damping force in the valve 210. To simulate a spring force and a damping force, a proportional feedback term in the soft position control loop may incorporate a spring term and a damping term.

The proportional feedback term in the soft position control loop acts similar to a mechanical spring because the force generated by a linear actuator in response to a control output that is proportional to the error in valve position has a mathematical effect similar to a spring. An equation for a mechanical spring may be represented as follows:

$$F = -K^*(X - X_o) \tag{1}$$

where F is the force output, K is the spring constant, $X_o$ is the rest position and X is the actual position.

Similarly, an equation for a soft position loop with a proportional term may be represented as follows:

$$F = -K_p^*(X - X_{target}) \tag{2}$$

where F is the force output, $K_p$ is an aggregate gain, $X_{target}$ is the targeted valve position, and X is the actual valve position. The aggregate gain $K_p$ may include the gain of the actuator, the actuator drive circuitry and the constant in the feedback loop. Those of ordinary skill in the art may determine and set $K_p$ based on various constraints and design goals. In one example, $K_p$ may not be set so high as to cause the system to be unstable but should be high enough that, when subjected to large fluid flows, sufficient pressure drop is generated by the force of the valve against the force developed by the pressure drop. $K_p$ may also be set large enough to be able to open the valve and decrease the pressure drop across the valve.

The equation for the damping component may be represented as follows:

$$F_{damp} = -K_d^* v \tag{3}$$

where $F_{damp}$ is the force produced by the damping term, $K_d$ is a tunable damping constant and v is the velocity of the moving valve. The damping force $F_{damp}$ may include the system component gains including the force constant of the actuator, the current gain of an amplifier driving the current through the actuator and other component gains.

The soft position controller 230 may be implemented as any circuit or circuitry, including an integrated circuit, configured to perform the functions described herein. As used in any embodiment herein, "circuit" and "circuitry" may include, for example, singly or in any combination, hardwired circuitry, programmable circuitry, state machine circuitry, and/or firmware that stores instructions executed by programmable circuitry. "Integrated circuit", as used in any embodiment herein, may include a circuit or circuitry in the form of a semiconductor device and/or microelectronic device, such as, for example, a semiconductor integrated circuit chip. Those skilled in the art will recognize various implementations for the soft position controller 230 including any combination of hardware, software and firmware that is configured or programmed to perform the functions described herein.

By controlling the valve position in this way, the exemplary valve control system 200 may address several problems for the designer and users of an electrically controlled pressure relief valve. The exemplary valve control system 200 effectively adds a spring in parallel with the mechanical spring of the valve. This parallel spring increases the effective bandwidth of the valve system and allows the designer to adjust the slope of the resulting constant command curve in the flow-pressure relationship (see FIG. 4). The designer may adjust the slope by increasing or decreasing the aggregate gain $K_p$. As the aggregate gain $K_p$ is increased, the effective parallel spring rate increases and thus the slope of the flow-pressure relationship increases so that the pressure is higher for a given flow.

The damping term may be used in the electronic feedback to the valve to reduce the inherent hydraulic damping of the valve to the minimum necessary for any other system constraints, such as the default/failure mode described in greater detail below. The damping term may also permit reduction in the mechanical damping necessary to stabilize the valve. This may increase the effective bandwidth of the mechanical system and provide a consistent damping coefficient across a large range of operating conditions. Given no other system constraints, the designer may reduce the hydraulic damping of the valve components to the absolute minimum. The electronic feedback loop may then reintroduce a damping term that is constant over system temperature, operating position and pressure. Thus, the valve step response can be more consistent across changing operating parameters such as temperature, thereby minimizing or eliminating the need to carefully control the hydraulic damping of the valve. This may allow the designer to find a performance optimum that is stable but not too sluggish to be useful.

The soft position control loop may also allow the system designer to avoid using pressure feedback to set the pressure directly. Direct pressure feedback may be ineffective, because the overall system hydraulic parameters of compliance and inertia vary significantly from system to system. Also, with large values for either of those hydraulic parameters (compliance or inertia), there is substantial phase lag from command to the valve to the effect on the output pressure. As a pressure relief valve interacts with the system hydraulics and begins to oscillate, therefore, a pressure loop may not effectively damp that oscillation due to the phase lag in the pressure actually developed. By contrast, the soft position loop may effectively damp that oscillation because the effects of the oscillation have no phase lag as measured by the position of the valve. Thus, by using the soft position loop to indirectly control the output pressure created by the valve, a user of the valve can install the valve in a variety of systems and may have satisfactory bandwidth and damping without having to tune the device to the application.

The exemplary electrically controlled pressure relief valve 100 (see FIG. 1) may also include one or more valve orifices 114 having a modified shape to provide a tunable pressure term. The pressure developed across the pressure relief valve nominally drives the valve more open as flow increases and allows the valve to close as the flow decreases. From a static standpoint, this is the operating principle of a pressure relief valve. In the time domain, this operating characteristic enables high bandwidth operation of the electrically controlled pressure relief valve.

In certain shock absorber applications, for example, the shock inputs may have a time domain characteristic that would be considered to have high frequency content. In such applications, it may be advantageous for the electrically controlled pressure relief valve to have additional bandwidth during high shock events. This permits the system to respond aggressively to large shock inputs, while remaining stable throughout the remainder of operating conditions.

As described above, the valve orifice(s) 114 in the pressure relief valve 100 open progressively as flow increases. This allows the pressure across the valve 100 to remain constant or increase slightly with flow. The pressure across the valve 100 may change with the displacement change, however, if the flow is relatively constant and the valve 100 is caused to be displaced physically from the static operating point by changes in the electronic command to the valve 100. If the valve 100 is displaced more towards open, the pressure term may be reduced and the spring 118 may continue to provide a restoring force even though the pressure term is generally driving the valve 100 open. This remaining restoring force pushes the valve 100 (e.g., the piston 116) back towards closed. Similarly, if the valve 100 is displaced toward closed, the pressure term increases and serves to push the valve 100 back toward open. As a result, the pressure term can appear to be another spring in parallel with the mechanical spring 118 in the valve 110 and the spring rate associated with the electronic soft position control loop. Without sufficient damping, under high flow conditions, this additional effective hydraulic spring may cause unstable behavior in pressure relief valves and may limit bandwidth.

The soft position control loop described above may be used to mitigate this effective hydraulic spring. To further mitigate the effective hydraulic spring and make the effective hydraulic spring work to the advantage of the system performance, the orifice 114 in the valve 100 may be modified to increase stability and improved bandwidth, as described in greater detail below.

As described above, the pressure across the valve 100 increases and decreases at a given flow when the valve 100 (e.g., the valve piston 116) is displaced towards closed or open. The rate of change of the pressure over that displacement interval multiplied by the effective area of the valve 100 produces the effective hydraulic spring rate at that flow and position. As the flow approaches zero, this effective hydraulic spring rate approaches zero regardless of the operating point and valve shape. As the flow increases, the effective hydraulic spring rate increases, since the pressure term is increasing due to the pressure drop across the valve 100.

Because flow creates an effective hydraulic spring that is an increasing function of flow, the orifice shape has an affect on that effective hydraulic spring rate. For a fixed orifice size, the pressure drop across an orifice is quadratic with flow. For an orifice size that increases in response to increased flow, the specific numerical relationship is more complex. In general, a slowly varying orifice area (A) as a function of valve position (X) will result in small changes in pressure, and a rapidly varying orifice area (A) will result in large changes in pressure. The rate at which the orifice area is varying is measured relative to the actual orifice size at the operating point. The derivative of area with respect to position (dA/dx) over the actual area (A) at that point is the best measure of the rate of orifice change, as indicated in the following equation:

$$\frac{\frac{dA}{dx}}{A} \tag{4}$$

The operating points may be a function of flow and command to the valve 100, and thus as a practical matter, the valve 100 may operate over narrow ranges for a given flow.

If the orifice is a drilled hole (e.g., circular in shape), the orifice opens up quickly at first, is relatively linear in area increase throughout the middle of its stroke and then no longer increases in area. That region in which the orifice is opening quickly is the critical region that may push a pressure relief valve toward instability. With such a rapid increase in area over a short operating distance, the change in effective hydraulic spring rate is significant. This effective hydraulic spring added to the mechanical spring and to the electronic spring in the case of the soft position loop may increase the effective bandwidth of the valve having circular orifices to the point of oscillation and instability.

Figure 4:
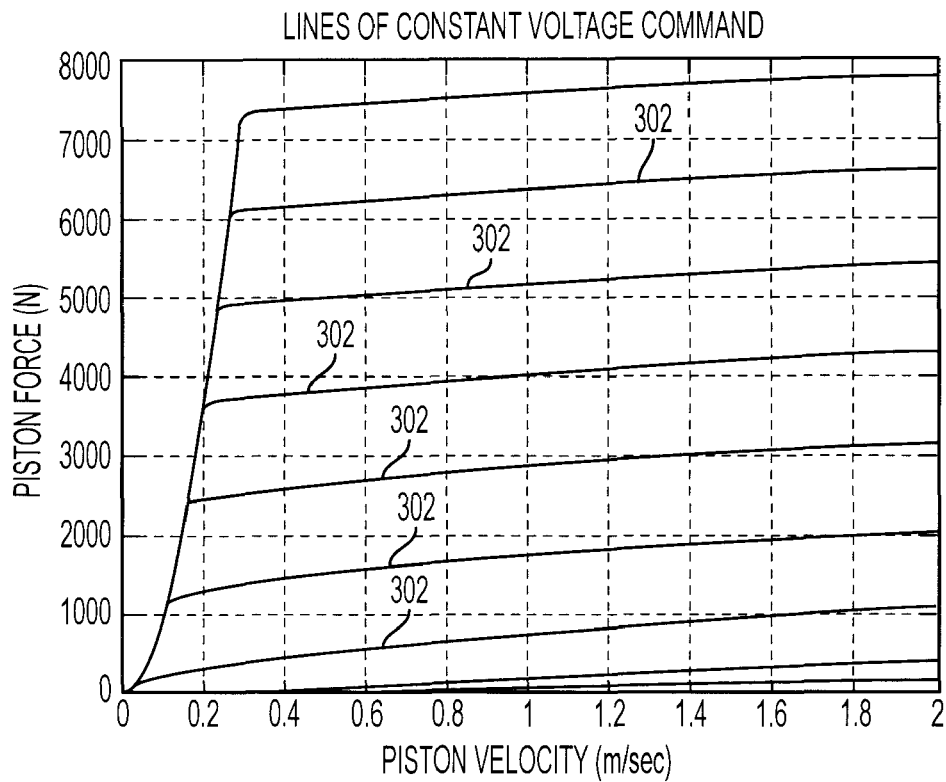
FIG. 4 is a graph illustrating the relationship between the piston velocity and the output force of a hydraulic ram in a hydraulic system in which an electrically controlled pressure relief valve controls the pressure differential across the piston in the hydraulic ram.

Referring to FIGS. 4-10, the tunable pressure term and modification of the valve orifice is further described in reference to the operating characteristics of the electrically controlled pressure relief valve. FIG. 4 shows the relationship between the piston velocity and the output force in a hydraulic system in which the electrically controlled pressure relief valve, consistent with one embodiment of the present invention, controls the pressure differential across a piston in a hydraulic ram. The piston force represents the force of the piston in the hydraulic ram and is related to the pressure. The piston velocity represents the velocity of the piston in the hydraulic ram and is related to flow. The voltage command is being varied between each of the lines 302 in this plot. The system provides a well controlled and understood pressure difference across the piston as a function of voltage command for a large range of flows.

Figure 5:
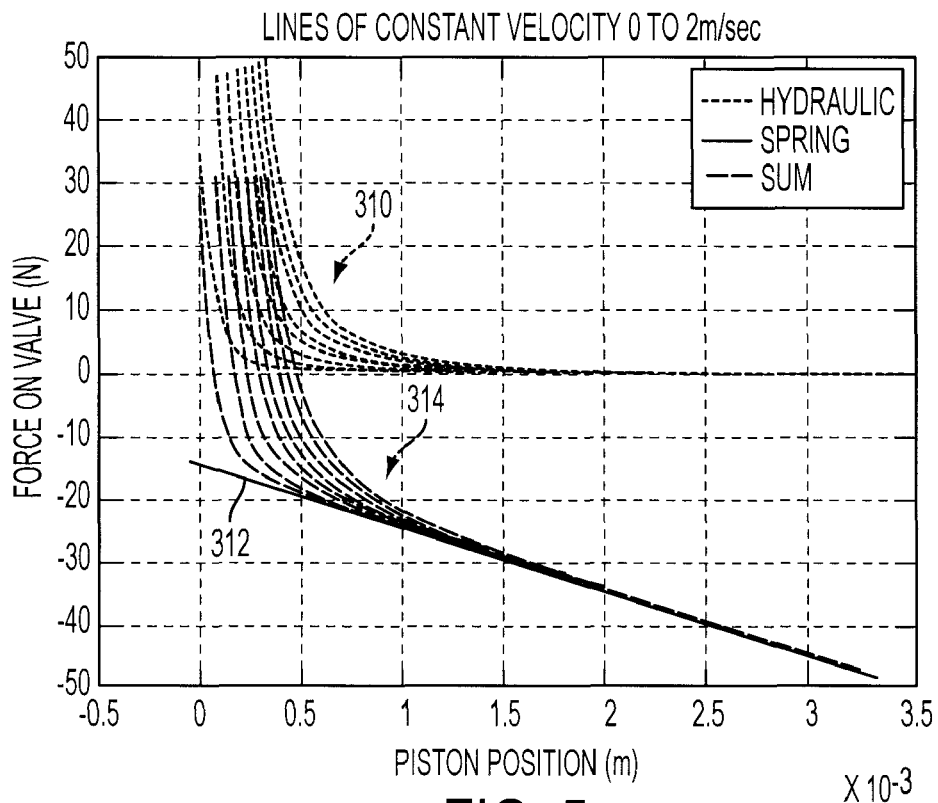
FIG. 5 is a graph illustrating the effective output force across a pressure relief valve as a function of valve position for given constant flows or velocities.

FIGS. 5-8 illustrate the operating characteristics of a pressure relief valve that is excited with a series of constant flows while varying the position of the piston in the valve. FIG. 5 shows the effective output force across a pressure relief valve having a conventional orifice shape as a function of valve position for a given constant flow (i.e. velocity) through the valve. The lines 310 represent the hydraulic force on the valve due to the pressure drop across the valve acting on the area of the valve piston. The line 312 shows the spring force on that same valve, which is a function of the position only and is unchanged for any flow rate through the valve. The lines 314 show the sum of the two forces which is the combined effective spring rate and sets the effective bandwidth of the valve for any combination of operating conditions. Where the lines 314 intersect the x-axis is the static operating point after the transients settle out.

Figure 6:
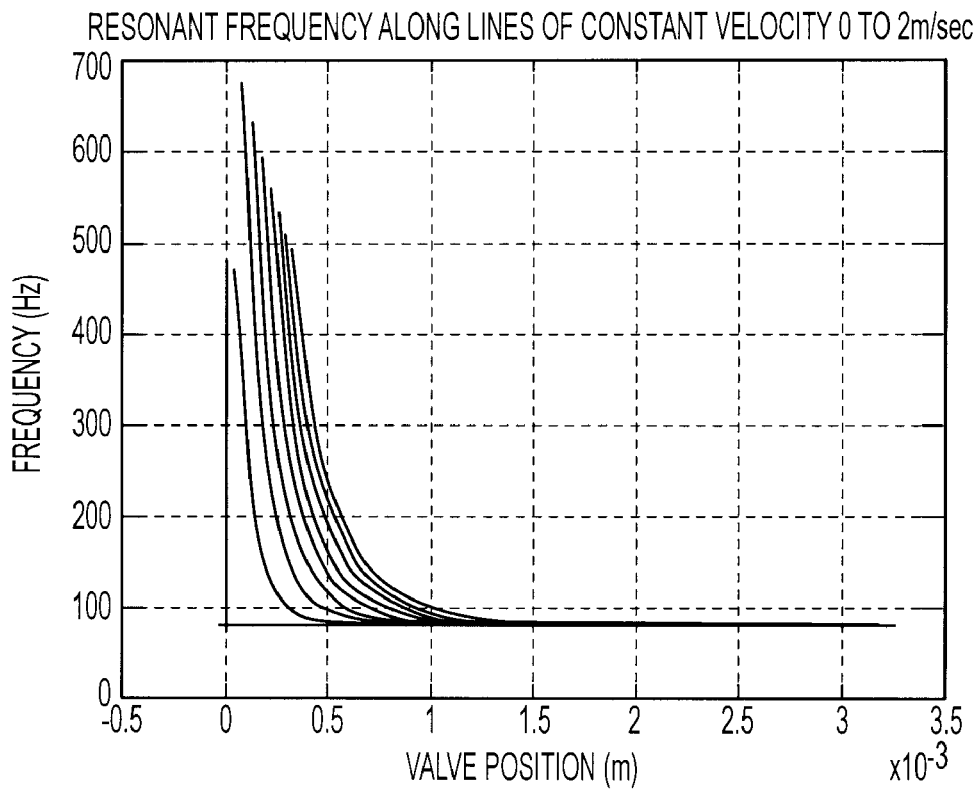
FIG. 6 is a graph illustrating the resonant frequency of a pressure relief valve as a function of valve position for given constant flows or velocities.

FIG. 6 shows the resonant frequency of a pressure relief valve having a conventional orifice shape along lines of constant flow or velocity. The large slope change across the operating range and flows creates a system with a widely varying bandwidth. Thus the system may have a fast response when closed and with high flows, but will return to its simple mass spring resonant frequency once the valve is sufficiently open.

The bandwidth may be more evenly distributed across the operating range of the valve 100 in a number of ways. Hydraulic damping may be added to the valve; however, this may increase the step response time. The soft position control loop described above may also be used to improve bandwidth, although this type of control uses additional power to stabilize the valve and does not help the valve operate in an unpowered state.

According to one embodiment, a pressure relief valve with a modified orifice shape may also be used to more evenly distribute the bandwidth across the operating range of the valve by providing an orifice area that changes evenly relative to the area at that operating point. If the orifice shape is such that the orifice area is increasing with displacement in proportion to the area at each operating point, the effective hydraulic spring rate may be spread evenly over the entire operating region of the valve. Essentially, the bandwidth of some operating regions may be pulled up while the bandwidth of other operating regions may be pulled down. Thus, the effective hydraulic spring rate no longer has the undesirable characteristics of being very large at the onset of opening and then diminishing as the orifice area increases with valve position. For a given flow rate, therefore, the worst case effective bandwidth of the valve may be improved.

Figure 7:
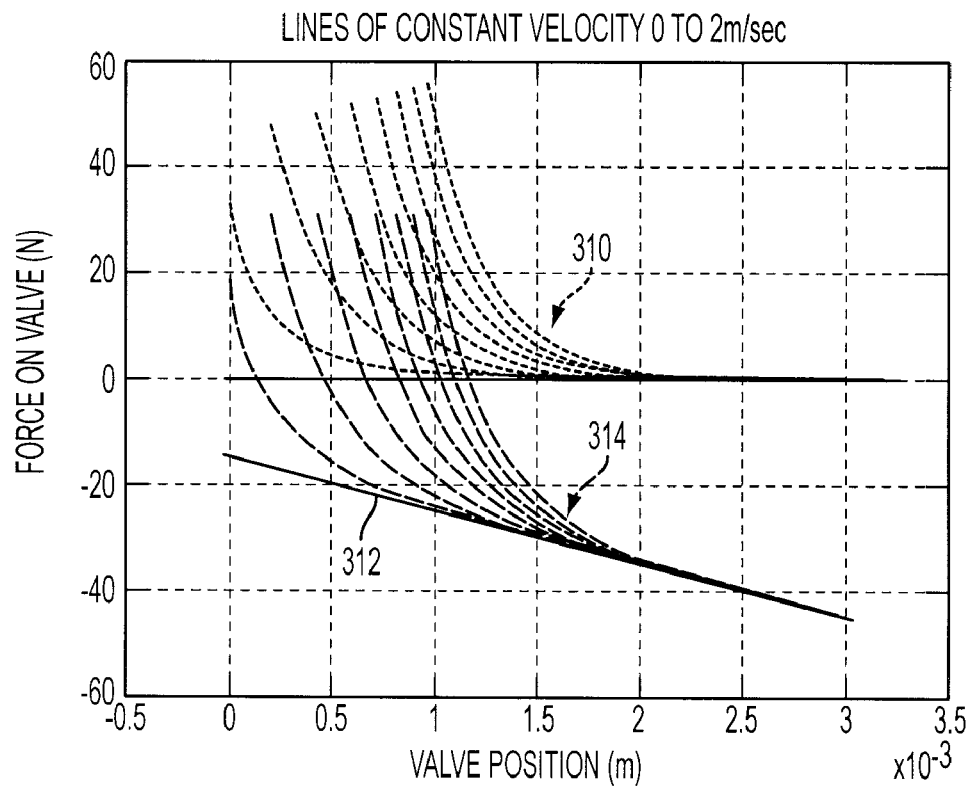
FIG. 7 is a graph illustrating the force on a pressure relief valve having a modified orifice, consistent with one embodiment of the present invention, as a function of valve position for given constant flows or velocities.

FIG. 7 shows the effective output force of a pressure relief valve having a valve orifice with a modified shape, as described above. The modification of the orifice shape effectively spreads out the available hydraulic bandwidth over a greater valve position operating range, as compared to FIG. 5.

Figure 8:
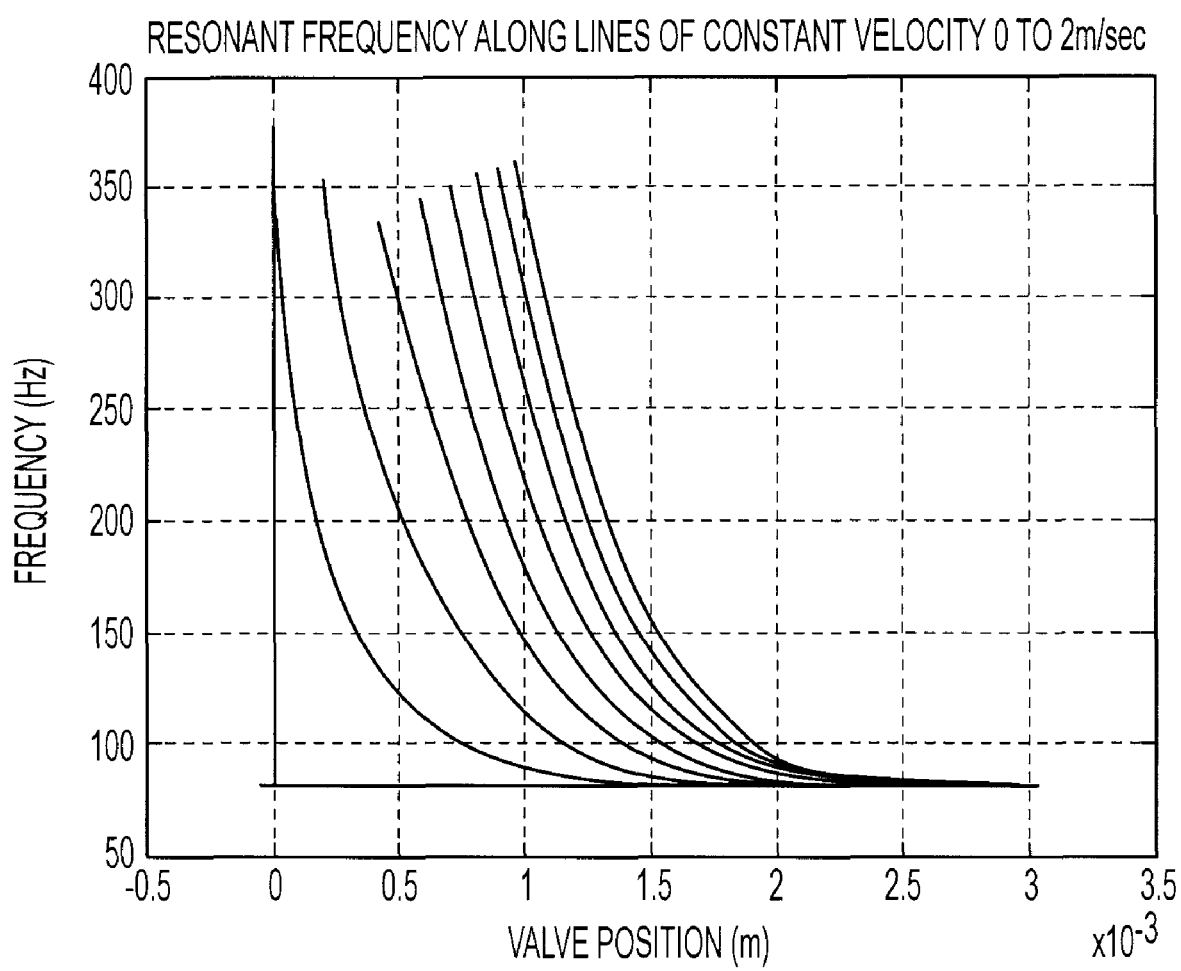
FIG. 8 is a graph illustrating the resonant frequency of a pressure relief valve having a modified orifice, consistent with one embodiment of the present invention, as a function of valve position for given constant flows or velocities.

FIG. 8 shows a plot of effective resonant frequency for a valve having an orifice with a modified shape, as described above. The effective resonant frequency is higher over a broader range of operating positions and reaches a maximum at much lower values. Thus, the valve has more available bandwidth across its operating range, as compared to the valve represented in FIG. 6.

Therefore, by utilizing the pressure term and modifying the orifice shape, the pressure relief valve bandwidth may be increased and limited to provide high performance without compromising stability.

The exemplary electrically controlled pressure relief valve 100 may also include a modified orifice shape that provides a tunable default/failure mode. Many applications (e.g., shock absorber applications) have a need for effective but limited performance in the event power is lost, a fault occurs or power is never applied (e.g., a car being towed). In such applications, it may be preferable for the pressure relief valve to have repeatable, reasonable behavior so that a mission can continue, a job can be completed or an operation performed to some reduced level of performance.

To provide the exemplary electrically controlled pressure relief valve 100 with a default/failure mode, the valve orifice 114 may be shaped such that the bandwidth is effectively relatively flat over the operating region of the valve. This same orifice shape may also prevent the existence of any excessively high bandwidth regions causing instability, as described above. The mechanical damping may thus be reduced to the point where it is still sufficient to avoid oscillation without the benefit of additional electrical damping.

A series impedance may also be introduced to provide some linearity in the pressure-flow characteristic. Nominally, a pressure relief valve with a large spring preload, but a relatively soft spring, has a flat pressure output across a range of flows. To provide some slope to this pressure output characteristic, a hydraulic restriction placed in series with the main valve may have an increasing pressure for a given flow. The slope of this pressure output characteristic may be increased with a smaller restriction. Those of ordinary skill in the art may therefore tune the pressure output characteristic with this series impedance to produce a default operating condition typical of a passive valve that is not electrically controlled.

The exemplary embodiment of the electrically controlled pressure relief valve may therefore overcome a significant drawback of conventional positional control valves. In conventional valves having, at best, a quadratic relationship between flow and pressure, it may be difficult to tune the valves to be effective in an unpowered condition because force will be too low at low flows and increases too rapidly at high flows.

Figure 9:
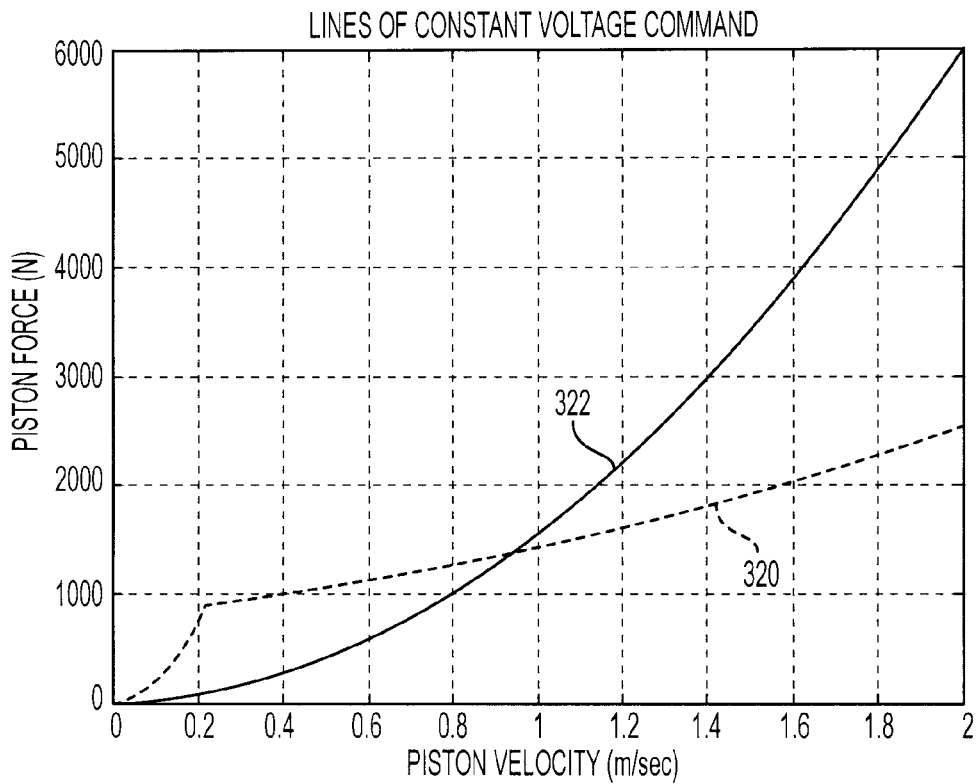
FIG. 9 is a graph illustrating the relationship between the piston velocity and the output piston force of a hydraulic ram in a hydraulic system during an unpowered condition.
Figure 10:
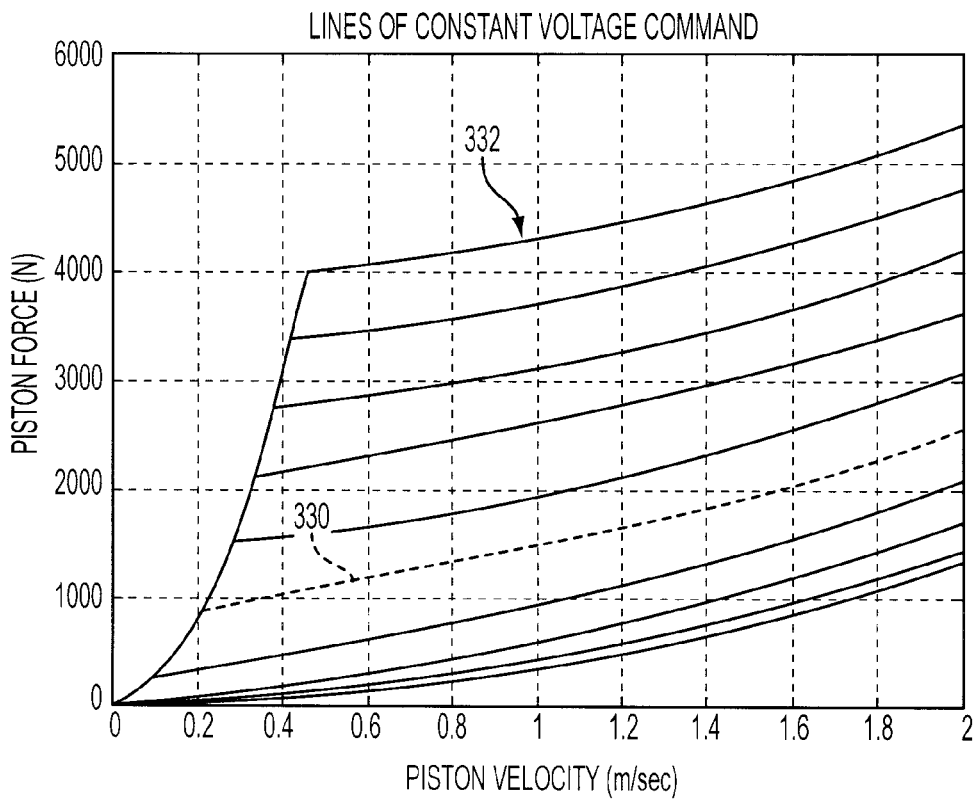
FIG. 10 is a graph illustrating the relationship between the piston velocity and the output piston force of a hydraulic ram in a hydraulic system for different constant voltages applied to an electrically controlled pressure relief valve in the system.

FIGS. 9 and 10 show the relationship between the piston velocity and the output force of a hydraulic ram in a hydraulic system including an electrically controlled pressure relief valve having a default/failure mode. The piston velocity and output force of the hydraulic ram generally correspond to the input flow and output pressure in the electrically controlled pressure relief valve. The curve 320 represents the default, unpowered characteristic of the electrically controlled pressure relief valve. This characteristic is similar to the characteristic of a passive shock absorber's damper curve. The curve 322 represents a typical quadratic relationship between the input flow and output pressure relationship of a standard or conventional unpowered positional valve. At low flows (i.e., low piston velocity) through the standard or conventional unpowered positional valve, the forces are negligible and would make the performance of the damper too soft to provide adequate control of a vehicle. At high flows (i.e., high piston velocity) through the standard or conventional unpowered positional valve, the forces are too high, resulting in a very stiff feel for larger shock events, to the point where the large shock events are hardly filtered at all.

In the exemplary embodiment of the electrically controlled pressure relief valve providing a default mode, the commands (i.e., when the electronics are on and defining the performance) may be, for the most part, only deviations from the default rather than large differences from the unpowered condition. This helps to reduce the average power required by the device, thereby avoiding overheating and overall energy consumption. The tunable pressure term, as described above, may be used to provide adequate damping in default (unpowered) mode and to reduce the average power required by placing the default mode flow v. pressure curve as close to the center of the nominal target curve as possible.

FIG. 10 shows the voltage command being varied in an electrically controlled pressure relief valve having a default mode, consistent with one embodiment of the present invention. In this plot, the line 330 represents the zero power condition of the exemplary electrically controlled pressure relief valve. All of the other lines represent perturbations from the zero power condition. Because the zero power line 330 is tuned to be close to the performance of a representative passive system, a soft position controller may provide input to refine the performance about that center line. The remaining lines 332 represent the range of performance possible for the system and thus the limit of the required deviation from the zero power line 330.

Figure 11:
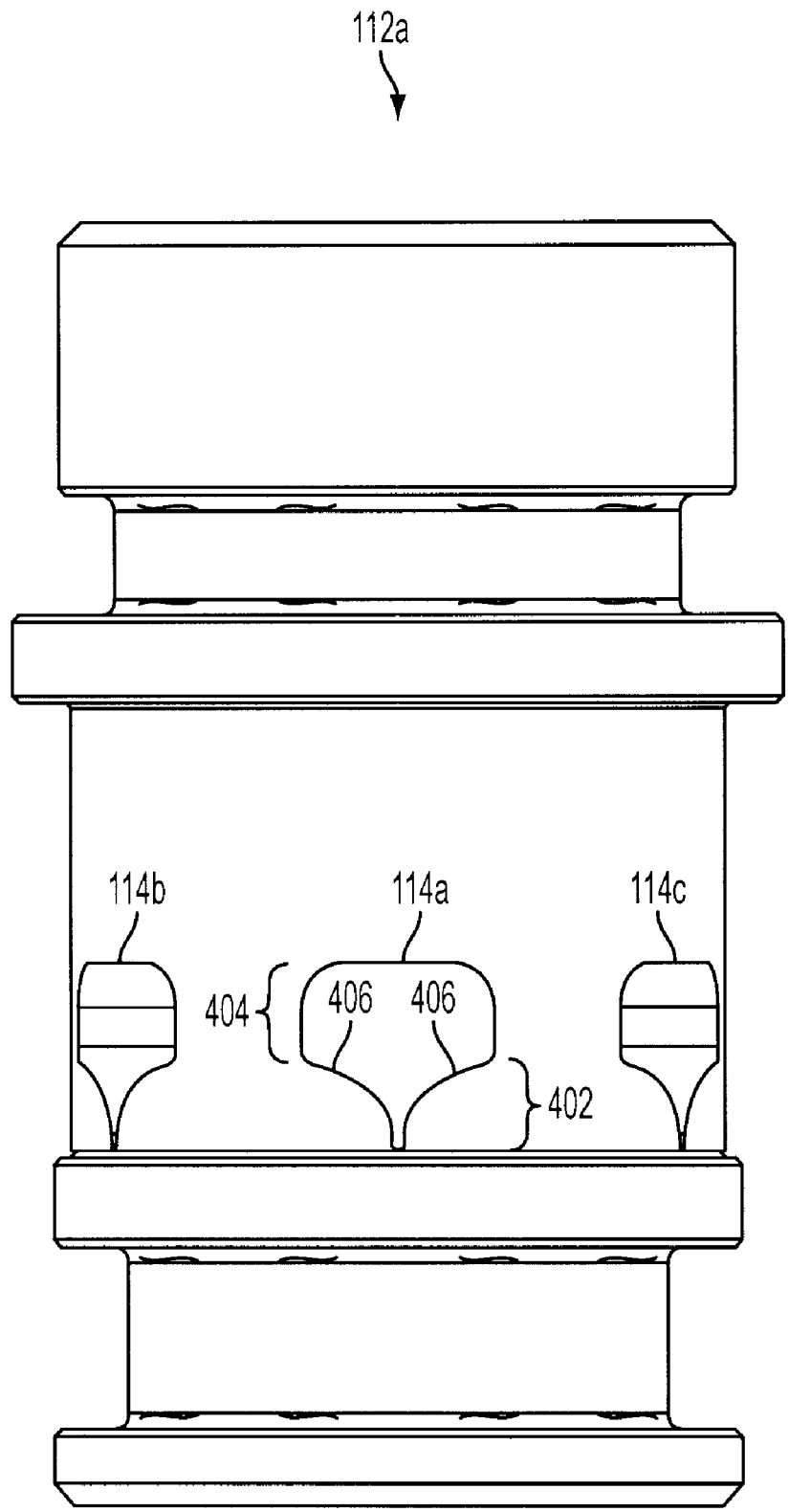
FIG. 11 is a side view of a valve cylinder including a valve orifice having a modified shape, consistent with one embodiment of the present invention.

FIG. 11 shows one embodiment of a valve cylinder 112a including an orifice 114a having an orifice shape that may improve stability and distribute the effective bandwidth over the valve operating range. This illustrated orifice shape may also provide the tunable default or failure mode. The illustrated orifice 114a includes a first half portion 402 having a smaller orifice area at the beginning of the stroke when the valve is opened and a second half portion 404 having a larger orifice area at the end of the stroke. The first half portion 402 of the orifice 114a may include convex sides 406. The modified shape of the exemplary valve orifice 114a also provides a rapidly varying orifice area in the first half portion 402 (resulting in large changes in pressure) and a slowly varying orifice area in the second half portion 404 (resulting in small changes in pressure).

The valve cylinder 112a may include one or more orifices 114a-114c with the modified shape spaced around the circumference of the cylinder 112a. In one embodiment, the orifices 114a-114c may be formed by a wire EDM (electrical discharge machining) process. Alternatively, the orifices 114a-114c may be formed by drilling a series of holes to form the desired shape.

Although one shape is shown, those skilled in the art will recognize that the concepts described herein may be used to design other shapes to improve bandwidth, to improve stability, and/or to provide a default/failure mode. To design different shapes, those skilled in the art may measure the resulting quasi-static flows versus target position and stability and may modify the shape until the desired stability and flow range are satisfied.

Accordingly, a modified orifice shape in an electrically controlled pressure relief valve and/or the use of a soft position control loop to control the positioning of the valve improves the performance of the valve.

Consistent with one embodiment, a method is provided for controlling an output pressure of an electrically controlled pressure relief valve. The method may include obtaining a target position of the valve; determining an actual position of the valve; generating a valve control signal indicative of a force to be applied to the valve to move the valve from the actual position to the target position; and applying the force to the electrically controlled pressure relief valve in response to the valve control signal such that the electrically controlled pressure relief valve provides a defined pressure output in response to a flow input.

Consistent with another embodiment, a soft position controller is provided for use in controlling an electrically controlled pressure relief valve. The soft position controller may include circuitry configured to generate a valve control signal indicative of a force to be applied to a valve piston of the electrically controlled pressure relief valve to move the valve piston from an actual position to a target position such that the electrically controlled pressure relief valve provides a defined pressure output in response to a flow input.

Consistent with a further embodiment, a valve control system may include a pressure relief valve configured to receive an input fluid flow and providing an output pressure; an actuator configured to actuate the pressure relief valve by applying a force to a valve piston of the pressure relief valve; and a soft position controller configured to generate a valve control signal indicative of the force to be applied to the valve piston to move the valve piston from an actual position to a target position such that the pressure relief valve provides a defined pressure output in response to a flow input.

Consistent with yet another embodiment, a pressure relief valve may include a valve piston configured to move in response to a pressure and a valve cylinder receiving the valve piston. The valve cylinder defines at least one valve orifice and movement of the valve piston within the valve cylinder opens and closes the valve orifice. The valve orifice being shaped such that an orifice area changes evenly relative to the orifice area at a given operating point. The pressure relief valve may also include a spring biasing the piston toward a closed position wherein the piston closes the valve orifice.

The terms and expressions which have been employed herein are used as terms of description and not of limitation, and there is no intention, in the use of such terms and expressions, of excluding any equivalents of the features shown and described (or portions thereof), and it is recognized that various modifications are possible. For example, the exemplary circuitry can be implemented in different ways to provide the functionality described herein. Other modifications, variations, and alternatives are also possible.

What is claimed is:

1. A method of controlling a pressure output of an electrically controlled pressure relief valve using a soft position control loop, said method comprising:

generating a valve control signal based on, at least in part, a proportional feedback term incorporating at least a spring term, the proportional feedback term being proportional to a difference between an actual valve position and a target valve position, said valve control signal being indicative of a force to be applied to said electrically controlled pressure relief valve, which will move said electrically controlled pressure relief valve from said actual position toward said target position without directly moving said pressure relieve valve to said target position such that said force to be applied to said electrically controlled pressure relief valve simulates at least a spring force.

2. The method of claim 1, further comprising applying said force to said electrically controlled pressure relief valve in response to said valve control signal such that said electrically controlled pressure relief valve provides a linear pressure output in response to a plurality of flow inputs.

3. The method of claim 1 wherein said force applied in response to said valve control signal simulates a spring force and a damping force in said electrically controlled pressure relief valve.

4. The method of claim 1 wherein said valve control signal is based on, at least in part, an aggregate gain value representing at least the gain of an actuator applying said force and drive circuitry of said actuator.

5. The method of claim 1 wherein said electrically controlled pressure relief valve comprises a valve cylinder defining at least one valve orifice and a valve piston is movably disposed in said cylinder to open said valve orifice, and wherein said force is applied to said valve piston.

6. The method of claim 5 wherein said valve orifice is shaped such that an orifice area changes evenly relative to an area at a given operating point.

7. The method of claim 5 wherein said valve orifice includes a first half portion that opens at a beginning of a stroke of said valve piston and a second half portion that opens at an end of said stroke of said valve piston, and wherein said first half portion has a smaller orifice area than said second half portion.

8. A soft position controller for use in controlling an electrically controlled pressure relief valve, said soft position controller comprising:
circuitry configured to generate a valve control signal based on, at least in part, a proportional feedback term incorporating at least a spring term, the proportional feedback term being proportional to a difference between an actual valve position and a target valve position, wherein said valve control signal is configured to cause a force to be applied to said electrically controlled relief valve, which will move said electrically controlled pressure relief valve towards said target position without directly moving said pressure relieve valve to said target position such that said force simulates at least a spring force, wherein said electrically controlled pressure relief valve provides a defined substantially linear pressure output in response to a plurality of flow inputs.

9. The soft position controller of claim 8, wherein said force applied in response to said valve control signal simulates a spring force and a damping force in said electrically controlled pressure relief valve.

10. The soft position controller of claim 8, wherein said valve control signal is generated based on, at least in part, an aggregate gain value representing at least a gain of an actuator applying said force to said electrically controlled pressure relief valve and a gain of an actuator drive circuitry.

11. A valve control system comprising:
a pressure relief valve configured to receive an input fluid flow and providing an output pressure; and
a soft position controller configured to generate a valve control signal based on, at least in part, a proportional feedback term incorporating at least a spring term, the proportional feedback term being proportional to a difference between an actual valve position and a target valve position, wherein said valve control signal is configured to cause a force to be applied to said electrically controlled relief valve, which will move said electrically controlled pressure relief valve towards said target position without directly moving said pressure relieve valve to said target position such that said force simulates at least a spring force, wherein said electrically controlled pressure relief valve provides a defined substantially linear pressure output in response to a plurality of flow inputs.

12. The valve control system of claim 11 wherein said pressure relief valve comprises a valve cylinder receiving said valve piston, said valve cylinder defining at least one valve orifice shaped such that an orifice area changes evenly relative to said orifice area at a given operating point.

13. The valve control system of claim 12 wherein said valve orifice includes a first half portion that opens at a beginning of a stroke of said valve piston and a second half portion that opens at an end of said stroke of said valve piston, and wherein said first half portion has a smaller orifice area than said second half portion.

14. The valve control system of claim 11, further comprising an actuator configured to actuate said pressure relief valve by applying a force to a valve piston of said pressure relief valve, wherein said force is based on, at least in part, said valve control signal.

15. The valve control system of claim 14 wherein said force applied by said actuator simulates a spring force and a damping force in said electrically controlled pressure relief valve.

16. The valve control system of claim 14 wherein said actuator is back drivable.

17. A pressure relief valve comprising:
a valve piston configured to move in response to a pressure;
a valve cylinder receiving said valve piston, wherein said valve cylinder defines at least one valve orifice and movement of said valve piston within said valve cylinder opens and closes said valve orifice, said valve orifice being shaped such that an orifice area changes evenly relative to said orifice area at a given operating point;
a spring biasing said piston toward a closed position wherein said piston closes said valve orifice
an actuator configured to actuate said pressure relief valve by applying a force to said valve piston; and
a soft position controller configured to generate a valve control signal based on, at least in part, a proportional feedback term incorporating at least a spring term, the proportional feedback term being proportional to a difference between an actual valve position and a target valve position, wherein said valve control signal is configured to cause a force to be applied to said electrically controlled relief valve, which will move said electrically controlled pressure relief valve towards said target position without directly moving said pressure relieve valve to said target position such that said force simulates at least a spring force, wherein said electrically controlled pressure relief valve provides a defined substantially linear pressure output in response to a plurality of flow inputs.

18. The pressure relief valve of claim 17 wherein said valve orifice includes a first portion that opens at a beginning of a stroke of said valve piston and a second portion that opens at an end of said stroke of said valve piston, wherein said first portion has a smaller orifice area than said second portion, and wherein an orifice area of said first portion varies at a higher rate than an orifice area of said second portion.

19. The pressure relief valve of claim 17 further comprising a back drivable actuator configured to provide a force to said valve piston in response to a command.

20. The pressure relief valve of claim 17, wherein said force applied by said actuator simulates a spring force and a damping force in said pressure relief valve.

* * * * *

UNITED STATES PATENT AND TRADEMARK OFFICE
CERTIFICATE OF CORRECTION

PATENT NO.         : 7,933,688 B2                                   Page 1 of 1
APPLICATION NO.    : 11/942838
DATED              : April 26, 2011
INVENTOR(S)        : John LaPlante It is certified that error appears in the above-identified patent and that said Letters Patent is hereby corrected as shown below:

In column 11, line 4, Claim 1, delete "relieve valve" and insert -- relief valve --, therefor.

In column 11, line 47, Claim 8, delete "relieve valve" and insert -- relief valve --, therefor.

In column 12, line 6, Claim 11, delete "relieve valve" and insert -- relief valve --, therefor.

In column 12, line 57 (approx.), Claim 17, delete "relieve valve" and insert -- relief valve --, therefor.

Signed and Sealed this
Twenty-sixth Day of July, 2011

David J. Kappos
*Director of the United States Patent and Trademark Office*